(12) United States Patent
Rudkowski et al.

(10) Patent No.: US 11,435,174 B2
(45) Date of Patent: Sep. 6, 2022

(54) MEASUREMENT ARM RECEPTACLE DEVICE OF A MEASUREMENT SYSTEM

(71) Applicant: Carl Mahr Holding GmbH, Göttingen (DE)

(72) Inventors: Matthias Rudkowski, Rhumspringe (DE); Andreas Lange, Gleichen-Reinhausen (DE)

(73) Assignee: Carl Mahr Holding GmbH, Göttingen (DE)

( * ) Notice: Subject to any disclaimer, the term of this patent is extended or adjusted under 35 U.S.C. 154(b) by 0 days.

(21) Appl. No.: 16/624,547

(22) PCT Filed: Jun. 19, 2018

(86) PCT No.: PCT/EP2018/066183
§ 371 (c)(1),
(2) Date: Dec. 19, 2019

(87) PCT Pub. No.: WO2018/234270
PCT Pub. Date: Dec. 27, 2018

(65) Prior Publication Data
US 2020/0124393 A1 Apr. 23, 2020

(30) Foreign Application Priority Data
Jun. 21, 2017 (DE) ...................... 10 2017 113 709.2

(51) Int. Cl.
*G01B 5/008* (2006.01)
*G01B 5/00* (2006.01)
*G01B 5/28* (2006.01)

(52) U.S. Cl.
CPC ........... *G01B 5/0004* (2013.01); *G01B 5/008* (2013.01); *G01B 5/28* (2013.01)

(58) Field of Classification Search
CPC ......... G01B 5/008; G01B 5/0004; G01B 5/28
(Continued)

(56) References Cited

U.S. PATENT DOCUMENTS

| 5,185,936 A | 2/1993 | McMurtry |
| 5,505,005 A | 4/1996 | McMurtry et al. |

(Continued)

FOREIGN PATENT DOCUMENTS

| CN | 1699909 A | 11/2005 |
| CN | 101109629 A | 1/2008 |

(Continued)

OTHER PUBLICATIONS

Chinese First Office Action dated Mar. 1, 2021, in corresponding Chinese Application No. 201880041783.4, with English translation (17 pages).

(Continued)

*Primary Examiner* — Jacques M Saint Surin
(74) *Attorney, Agent, or Firm* — Fitch, Even, Tabin & Flannery LLP

(57) ABSTRACT

A measurement arm receptacle device of a measurement system for releasably arranging a measurement arm. The measurement arm receptacle device comprises a holding device that cooperates with a counter holding device of the measurement arm. The holding and counter holding devices may each comprise at least one retaining magnet. The measurement arm receptacle device comprises an electric contact part movable between a rest position and a working position. In the rest position the contact part is electrically connected with an electric reference potential and in the working position the electric contact part is electrically connected with a measurement arm contact of the measurement arm. Thus it can be unambiguously determined via the contact part, if a measurement arm is arranged at the measurement arm receptacle device and additionally a data carrier of the measurement arm electrically connected with the measurement arm contact can be read out.

23 Claims, 7 Drawing Sheets

(58) Field of Classification Search
USPC .................................................. 73/866.5
See application file for complete search history.

(56) References Cited

U.S. PATENT DOCUMENTS

| | | | |
|---|---|---|---|
| 5,598,132 A | 1/1997 | Stabile | |
| 7,024,783 B2 | 4/2006 | Trull et al. | |
| 7,204,033 B2 | 4/2007 | Mies | |
| 7,328,518 B2* | 2/2008 | Taniuchi | G01B 5/28 33/551 |
| 7,352,271 B2* | 4/2008 | Nemoto | G01B 7/012 33/505 |
| 7,784,333 B2* | 8/2010 | Nemoto | G01B 21/04 73/105 |
| 2004/0185706 A1 | 9/2004 | Price et al. | |
| 2007/0266582 A1 | 11/2007 | Nemoto et al. | |
| 2011/0146092 A1 | 6/2011 | Engel et al. | |
| 2017/0227346 A1 | 8/2017 | Yamauchi | |

FOREIGN PATENT DOCUMENTS

| | | |
|---|---|---|
| DE | 4437033 A1 | 4/1996 |
| DE | 19617023 C1 | 10/1997 |
| DE | 69221896 T2 | 1/1998 |
| DE | 69628017 T2 | 1/2004 |
| DE | 102004048095 A1 | 4/2006 |
| DE | 102004059468 B3 | 6/2006 |
| DE | 102009060784 A1 | 6/2011 |
| DE | 102011109580 A1 | 8/2014 |
| DE | 202015004013 U1 | 7/2015 |
| EP | 1669713 A1 | 6/2006 |
| EP | 1643208 A3 | 1/2012 |
| WO | 2016190502 A1 | 12/2016 |

OTHER PUBLICATIONS

British Office Action dated Sep. 24, 2021, in corresponding British Application No. GB2111095.2 (4 pages).

International Search Report and Written Opinion dated Oct. 16, 2018, in corresponding International Application No. PCT/EP2018/066183, with machine English translation (24 pages).

German Office Action dated May 22, 2018, in corresponding German Application No. 10 2017 113 709.2, with machine English translation (19 pages).

German Decision to Grant dated Oct. 10, 2018, in corresponding German Application No. 10 2017 113 709.2, with machine English translation (9 pages).

* cited by examiner

MEASUREMENT ARM RECEPTACLE DEVICE OF A MEASUREMENT SYSTEM

CROSS REFERENCE TO RELATED APPLICATIONS

This patent application is the national phase of PCT/EP2018/066183, filed Jun. 19, 2018, which claims the benefit of German Patent Application No. 10 2017 113 709.2, filed Jun. 21, 2017.

TECHNICAL FIELD

The invention refers to a measurement arm receptacle device of a measurement system for arranging a measurement arm at the measurement system. For example, the measurement system can be a measurement system of a stylus instrument. For example, the measurement system can be a measurement system of a stylus instrument. For example, the measurement system can be used to detect measurement values during determination of a roughness of a surface, geometry or shape of an object. The measurement system has a measurement arm that is pivotably supported and carries a measurement element at its free end facing away from the measurement system. The measurement element can be a contactless measuring measurement element or a tactile measuring measurement element, e.g. a probe tip, a probe skid or a probe ball. For the tactile measurement the measurement arm is brought into contact with the surface of the object that deflects the measurement arm according to the parameter to be measured, if the measurement arm or the measurement system is moved relative to the object. The deflection during pivoting of the measurement arm is detected by the measurement system and a measurement value for the measurement parameter to be determined can be determined therefrom.

BACKGROUND

It can be necessary to replace the measuring element or a measurement arm for different measuring tasks. For this the measurement system must provide a suitable measurement arm receptacle device. In the the stylus instrument known from DE 44 37 033 A1 the probe tip that is used for roughness measurement can be exchanged with a free probe system for measuring the waviness or shape of an object. A micro-stylus of a free probe system comprises a sliding skid at its free end that is mounted by means of a screw connection. For free probing the sliding skid can be removed.

DE 196 17 023 C1 describes a surface measurement apparatus having a permanent magnetic coupling device, with which a probe element can be arranged at the apparatus. Support locations are present at a rocker of the apparatus, wherein respectively one permanent magnet or one permanent magnet pair is assigned to each support location. Due to an effect of the magnet-retaining forces displaced from the center relative to the support locations, torques can be created for establishment of the coupling.

DE 10 2004 048 095 A1 describes a stylus instrument having a probe magazine. The probe arm can comprise an RFID-chip, the data of which can be read to identify the probe arm. The probe arm can be arranged or removed from support of the stylus instrument without tools by means of a retaining magnet.

An identification of a measurement element, e.g. a probe, by using a two-dimensional code (QR-code) is known from DE 20 2015 004 013 U1.

The identification of an exchangeable probe head by means of a readable chip is further described in DE 10 2004 048 095 A1. There the support locations between the exchangeable probe head and a probe head receptacle are used to establish an electrically conducting connection with the chip in order to allow readout. Thus, the support locations serve for a defined static support and additionally for establishing an electrical connection.

Starting therefrom it is an object of the present invention to improve the exchangeability of a measurement arm of a measurement system.

SUMMARY

This object is solved by a measurement arm receptacle device as well as an arrangement of a measurement arm receptacle device and a measurement arm as described herein.

In the inventive configuration of a measurement arm receptacle device of a measurement system the measurement arm receptacle device comprises a holding device for releasable mechanical arrangement of a measurement arm. The measurement arm receptacle device is additionally configured to establish an electric connection with the measurement arm, particularly to readout data stored on a data carrier of the measurement arm. For this the measurement arm receptacle device comprises an electric contact device with an electric contact part additionally and separate from a support arrangement and/or support locations for the static support. The contact part can be moved between a rest position and a working position, e.g. shifted and/or pivoted. The contact part is configured to take the rest position, if no measurement arm is arranged at the holding device. The contact part is further configured to abut against a measurement arm arranged at the holding device, if the measurement arm is releasably arranged in the holding device. In this case, the contact part is urged into the working position by the measurement arm.

In the rest position the contact part is connected with a reference potential. In the working position an electric connection with a measurement arm contact of the measurement arm is established. In doing so, readout of data on data carrier of the measurement arm is possible via the electric contact part of the measurement arm receptacle device.

The contact part thus fulfills two functions: In the rest position it is connected with the reference potential. In doing so, it can be definitely recognized by means of an electric evaluation that no measurement arm is arranged at the holding device. In the working position the contact part is electrically connected with the measurement arm contact of the measurement arm, such that at least one technical information of the measurement arm can be read from a data carrier present at the measurement arm by means of an evaluation. Thus, an electric connection with a measurement arm arranged in the holding device can be created for readout of information or data and concurrently it can be unambiguously determined, if no measurement arm is received in the holding device.

One single only electric contact or connection location between the measurement arm receptacle device and the measurement arm is sufficient. Due to the moveable support of the contact part, it is avoided that the contact part impedes the defined support of the measurement arm at the measurement arm receptacle device.

The contact part is connected with the reference potential in the rest position and is separated from the reference potential in the working position. In doing so, it can be unambiguously determined whether a measurement arm is arranged at the holding device or not. If the contact part abuts against a measurement arm contact, an electrically conducting connection with the measurement arm contact can be used for readout of identification information, technical data or any other information of the measurement arm. The measurement system can automatically determine what kind of measurement arm type is arranged at the holding device.

It is preferred, that the contact part is electrically connected with an electric conductor in the working position. The connection with this electric conductor can exist preferably also in the rest position. For example, the electric conductor can be connected with an evaluation device, such that the evaluation device can determine via the electric conductor whether the contact part is in the rest position or in the working position. The evaluation device can be further configured to read at least one information from a data carrier of the measurement arm in the working position of the contact part via the electric connection with the measurement arm contact.

It is preferred, that a biasing means is present. The biasing means creates a force that urges the contact part in the rest position. In the rest position the contact part abuts preferably at a stop surface. For creating the biasing force, the biasing means can comprise an electrically conductible spring contact.

It is additionally preferred that the stop surface is at least partly electrically conductible. For example, the stop surface can be formed by an electrically conductible surface on a circuit board. The stop surface is preferably electrically connected with the reference potential. If the contact part occupies the rest position, the mechanical contact of a contact part with the stop surface thus concurrently establishes the electric connection with the reference potential.

In a preferred embodiment the contact part is moved between a rest position and the working position that are distant from each other in a normal direction. The normal direction is preferably substantially orthogonal to the surface of a measurement arm contact of a measurement arm arranged at the holding device and/or substantially orthogonal to a surface of the measurement arm receptacle device from which the contact part extends in its rest position. In doing so, the normal direction can be at a right angle or deviate with an amount of up to 10° or up to 20° from the right angle relative to the surface of the measurement arm contact and/or the surface of the measurement arm receptacle device. For example, the normal direction can be orientated parallel to a longitudinal axis of the contact part that takes the rest position.

Preferably the contact part is supported by a contact part support device, such that it is not only moveable in one degree of freedom in normal direction, but moveable in at least one additional degree of freedom. For example, the contact part support device can be configured, such that the contact part is tiltably supported with regard to the normal direction and/or shiftably supported obliquely or orthogonal to the normal direction. By not guiding the contact part exactly in normal direction, an abutment of the contact part exactly at the same point on the surface of a measurement arm contact of a measurement arm arranged at the holding device can be avoided. Rather an additional movement component of the contact part along the surface and the measurement arm contact is allowed during insertion or removal of the measurement arm. It has shown that in doing so, possibly sticking dirt particles are removed and the reliability of the electric contacting can be improved.

In a preferred embodiment the contact part support device comprises a solid body support for supporting of the contact part. The solid body support can comprise a leaf spring, for example, that carries the contact part. In a preferred embodiment the leaf spring can have a coil spring section. The leaf spring is preferably configured, such that it creates only a negligible force component relative to the amount of the biasing force in and against the direction of the biasing force.

The holding device can comprise a support device that can comprise a plurality of support projections and/or support cavities. The support projections or the support cavities each form a respective support location. A counter support location of a counter support device of a measurement arm arranged at the measurement arm receptacle device is assigned to each support location, wherein a counter support location can be defined by a support projection or a support cavity. The support device with support projections or support cavities is configured to cooperate with the counter support device in order to predefine a statically unambiguously defined relative position and relative orientation between the measurement arm receptacle device and the measurement arm. In doing so, an exact measurement is possible. Particularly the support device defines together with a counter support device a measurement plane, in which the measurement element can be moved during a pivot movement of the measurement arm.

It is additionally preferred, that one or more present support projections and/or support cavities of the support device are electrically conductible and electrically connected with a reference potential respectively and preferably with the same reference potential with which a contact part is electrically connected in the rest position. The reference potential is preferably a ground potential. The reference potential can be provided to a measurement arm via the at least one electrically conductible support projection and/or the at least one electrically conductible support cavity of the measurement arm receptacle device. For this the measurement arm has at its counter support device at least one associated electrically conductible support projection or at least one associated electrically conductible support cavity.

The features and preferred embodiments of the measurement arm receptacle device and of the measurement arm discussed above can be individually or in combination used with a holding device of the measurement arm receptacle device or a counter holding device of the measurement arm described below. The configuration of the holding device and/or the counter holding device described in the following provides a possibility to create a sufficiently large holding force between the measurement arm receptacle device and the measurement arm with low efforts additionally or alternatively to the described configurations of the measurement arm receptacle device or the measurement arm described above. The low effort is particularly also achieved by the functional separation of the static support and the information transmission. The establishment and release of the connection between the measurement arm and the measurement arm receptacle device can be carried out without tools.

The measurement arm receptacle device comprises in this additional or separate aspect of the invention, a holding device and the measurement arm comprises a counter holding device that are configured to cooperate during establishment of the connection between the measurement arm receptacle device and the measurement arm. For this purpose the holding device has a first retaining magnet. The magnetic poles (north pole and south pole) of the first retaining magnet are arranged along a first magnet axis in a row. For example, the magnet axis can form a longitudinal axis or center axis through the center of gravity and/or the geometric center point of the retaining magnet.

At the counter holding device a second retaining magnet is present that cooperates with the first retaining magnet during the establishment of a mechanical connection. The magnetic poles of the second retaining magnet are arranged along a second magnet axis in a row. If the releasable connection between the measurement arm and the measurement arm receptacle device or the holding device and the counter holding device is established, the first magnet axis is not identical with the second magnet axis, i.e. that the first magnet axis and the second magnet axis are not orientated coaxially. The first magnet axis and the second magnet axis are displaced from each other and preferably do not comprise an intersection point. The first magnet axis and the second magnet axis can be orientated parallel to each other or inclined to each other. When the magnet axes extend coaxially to each other, the magnetic force is effective exclusively along or parallel to the magnet axes. By not orientating or arranging the magnet axes coaxially, the created magnetic force has a force component that is effective obliquely or orthogonal to the first magnet axis and/or the second magnet axis. In doing so, a magnetic force with a vector can be created that has two or three force components in different space directions, wherein the space directions refer to a Cartesian coordinate system that is fixedly located relative to the measurement arm receptacle device. In doing so, it is possible to create a magnetic force with one pair of a retaining magnet and a counter retaining magnet that sufficiently fixes the measurement arm at the measurement arm receptacle device in all space directions of the Cartesian coordinate system that is fixedly located relative to the measurement arm receptacle device.

In a preferred embodiment the holding device has a third retaining magnet, the magnetic poles of which are arranged along a third magnet axis in a row. The first magnet axis and the third magnet axis are orientated inclined under an angle relative to each other, preferably orthogonal. The counter holding device comprises a fourth retaining magnet, the magnetic poles of which are arranged along a fourth magnet axis in a row. The fourth retaining magnet cooperates with the third retaining magnet for the establishment of the releasable connection between the holding device and the counter holding device. If the connection between the counter holding device and the holding device is established, the third magnet axis and the fourth magnet axis are not orientated coaxially, i.e. not congruent. As described with regard to the first and the second magnet axis, in doing so a magnetic force is created that has two or three force components relative to the Cartesian coordinate system that is fixedly located relative to the measurement arm receptacle device.

It is also preferred, that the first magnet axis and the third magnet axis are orientated orthogonal to each other and/or if the second magnet axis and the fourth magnet axis are orientated orthogonal to each other. In such an embodiment sufficiently large magnetic forces can be created in all space directions without requiring an additional pair of magnets the magnet axes of which are orientated in this additional third space direction.

It is further advantageous, that the holding device comprises a fifth retaining magnet, the magnetic poles of which are arranged along a fifth magnet axis in a row. The fifth magnet axis is orientated parallel to the first magnet axis. In accordance the counter holding device can comprise a sixth retaining magnet, the magnetic poles of which are arranged along a sixth magnet axis in a row. The sixth magnet axis is preferably orientated parallel to the second magnet axis. The first retaining magnet and the fifth retaining magnet can be arranged at a common side or in a common surface of the measurement arm receptacle device or the holding device. Preferably the first retaining magnet and the fifth retaining magnet are arranged in a row in a measurement direction, in which the measurement arm moves along the object to be measured during the measurement, e.g. along the measurement plane, in which the measurement element can be moved by the pivot movement of the measurement arm.

Provision can be made that the fifth retaining magnet and the second retaining magnet repel each other, such that any attracting magnetic force between the fifth and the second retaining magnet during insertion of the measurement arm is avoided and, e.g. an attracting magnetic force is only created when the second retaining magnet and the fifth retaining magnet have been moved past each other. In doing so, the correct establishment of the releasable connection between the measurement arm and the measurement arm receptacle device is simplified.

BRIEF DESCRIPTION OF THE DRAWINGS

Advantageous embodiments of the invention are derived from the dependent claims, the description and the drawings. In the following preferred embodiments of the invention are discussed in detail with reference to the attached drawings. The drawings show:

DETAILED DESCRIPTION

Figure 1:
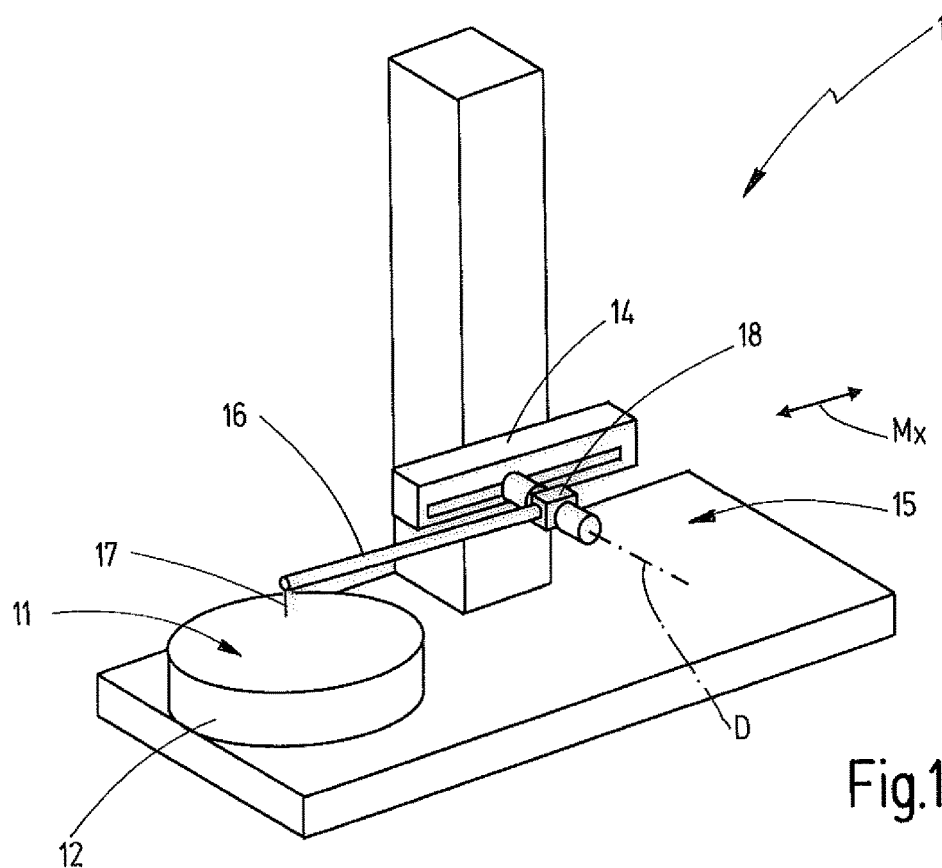
FIG. 1 a schematic perspective view of a measurement apparatus with a measurement system, wherein a measurement arm arranged at the measurement system takes a substantially horizontal position, FIG. 2 a measurement apparatus with the measurement system of FIG. 1, wherein the measurement arm takes a substantially vertical position, FIG. 3 a schematic perspective illustration of an embodiment of a measurement system with an inventive measurement arm receptacle device and a measurement arm that is releasably arrangeable thereon, FIG. 4 a schematic block diagram-like partly sectional illustration of an embodiment of a measurement system with a highly schematically illustrated measurement arm receptacle device, FIG. 5 a circuit diagram that schematically illustrates the electric connection between an electric correction device and electric connections provided at an assembly that is rotatably supported relative to the connection device, FIG. 6 a perspective illustration of a measurement arm receptacle device of FIG. 3, FIG. 7 a perspective illustration of an embodiment of a portion of a measurement arm that is configured to be connected with the measurement arm receptacle device of FIG. 6, FIG. 8 a schematic illustration of the electric connection of a support device of the measurement arm receptacle device with a reference potential, FIG. 9 a perspective illustration of an embodiment of a contact part support device for supporting a contact part of the measurement arm receptacle device, FIGS. 10 and 11 a schematic sectional illustration of the contact part of FIG. 9 in different positions respectively, and FIGS. 12 and 13 a highly schematic principle illustration of retaining magnets of the measurement arm receptacle device and retaining magnets of the measurement arm in different relative positions of the measurement arm and the measurement arm receptacle device respectively.
Figure 2:
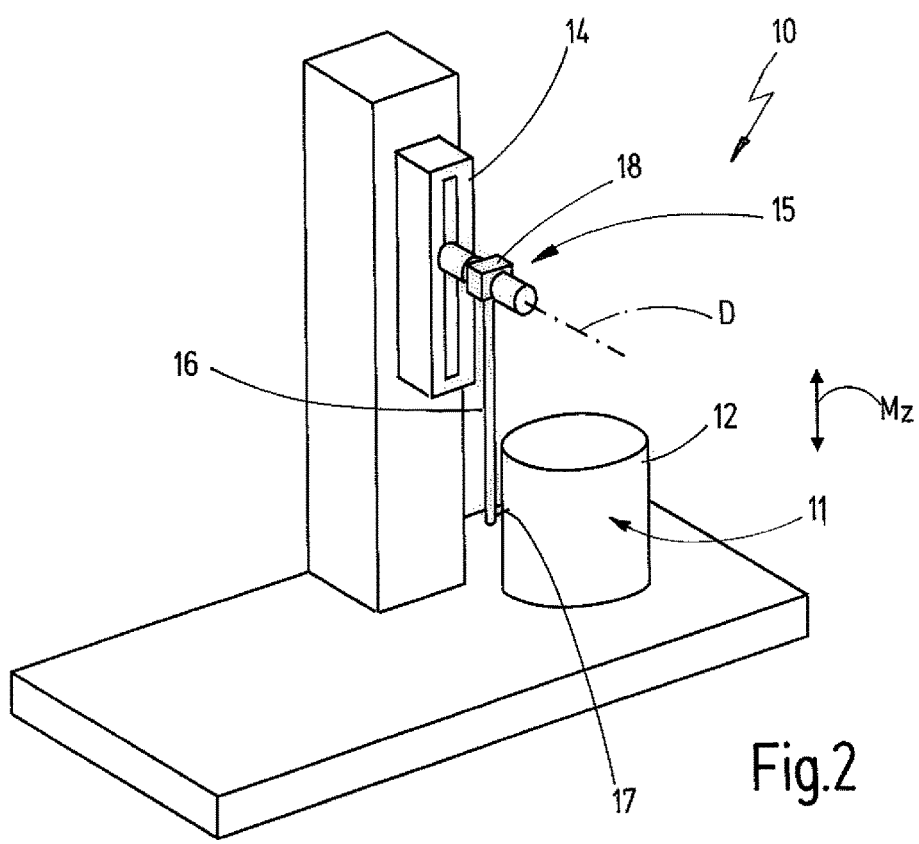
Figure 3:
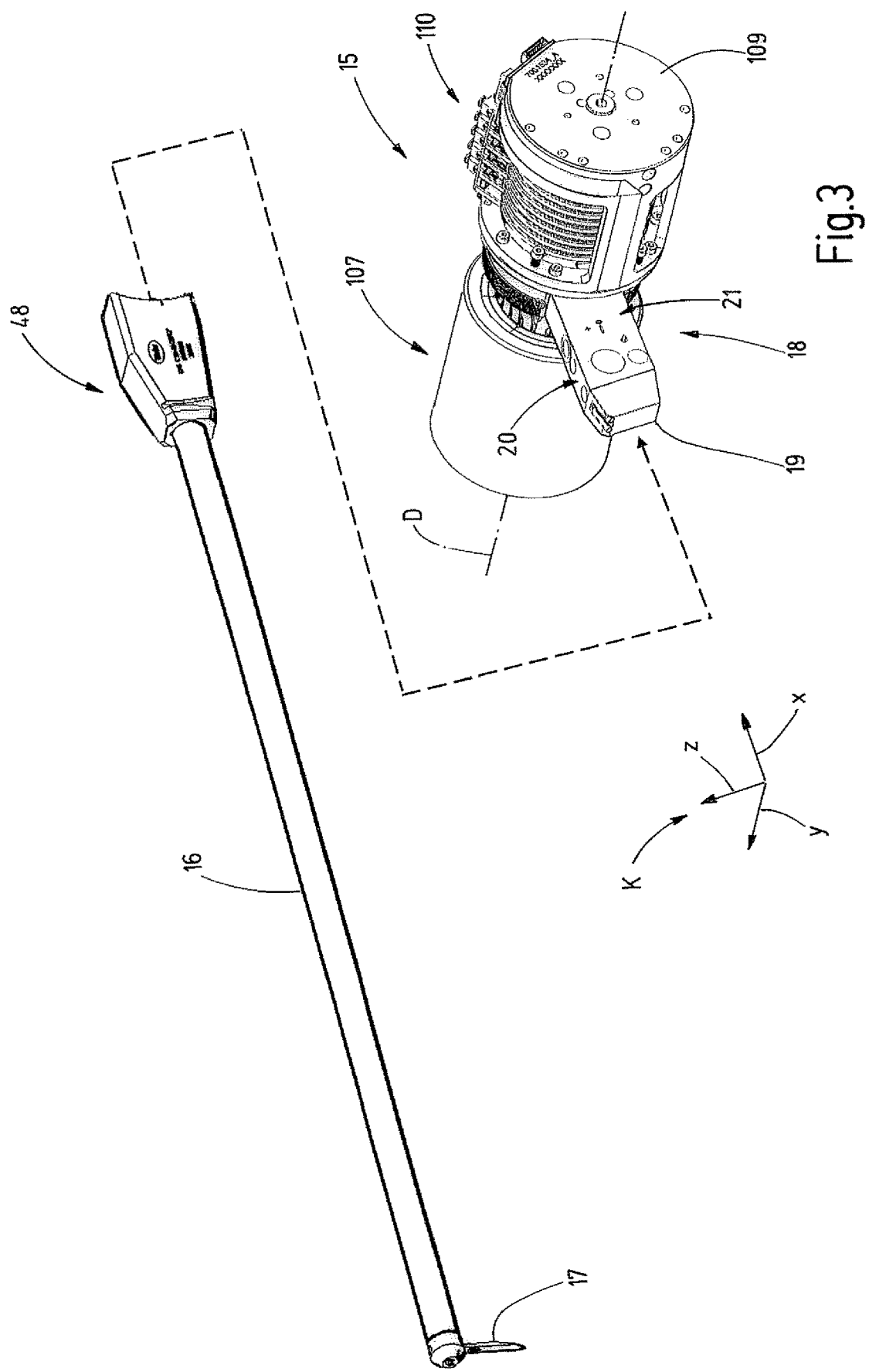

FIGS. 1 and 2 show a measurement apparatus 10 that can be used for measuring the surface roughness of a surface 11 of a workpiece or an object 12 for example. With such a measurement apparatus 10 also geometries or shape deviations of the object 12 can be measured.

The measurement apparatus 10 comprises a feed axis 14 and a measurement system 15 with a measurement arm 16. The measurement arm has a free end, at which a measurement element 17, e.g. a probe element for tactile or contact measurement of the object 12 is carried. At the end opposite the measurement element 17 the measurement arm 16 is received or held at a measurement arm receptacle device 18 of the measurement system 15. The measurement arm receptacle device is rotatably or pivotably supported about a rotation axis D.

By the feed axis 14 the measurement system 15 with the measurement arm 16 arranged thereon can be moved in a measuring direction during the measurement, e.g. in a horizontal measuring direction Mx or vertical measuring direction Mz. If the measurement element 17 is in contact with the surface 11 of the object 12 and is moved in the measuring direction along the surface 11 of the object 12, the measurement arm 16 is deflected by the measurement element 17 depending on the form, the geometry or the roughness of the surface 11. The measurement system 15 is configured to detect the pivot position of the measurement arm receptacle device 18 about the rotation axis D. During tactile measurement the pivot position is transmitted from the measurement arm 16 on the measurement arm receptacle device 18. Additionally, the position of the measurement element 17 in measuring direction Mx, Mz can be determined via the position of the feed axis 14. The measurement value pairs describing the pivot position and the respective associated position of the measurement element 17 in measuring direction can be used for determination of the roughness of the surface 11 or the shape or the geometry of the object 12.

Between the measurement arm 16 and the measurement arm receptacle device 18 a corresponding mechanical and electrical interface is created in order to mechanically connect or disconnect the measurement arm 16 with or from the measurement arm receptacle device 18. According to the example, this connection can be established and released without tools.

The measurement arm receptacle device 18 comprises a receptacle body 19 that is pivotably supported about the rotation axis D by a rotatable part 19a and extends substantially radially away from the rotation axis D. The receptacle body 19 can be configured integrally with the rotatable part 19a or can be commonly moveably connected with it. In the embodiment the receptacle body 19 has a first reference surface 20 or first reference side and a preferably orthogonal to the first reference surface 20 orientated second reference surface 21 or second reference side. In the illustrated embodiment the second reference surface 21 is arranged in a radial plane relative to the rotation axis D. With reference to a Cartesian coordinate system K that is locally fixed relative to the measurement arm receptacle device 18 or the receptacle body 19, the second reference plane 21 extends in a plane that is spanned by an x-direction and a z-direction of the coordinate system K. The first reference plane 20 extends at least in a back surface section 20a in a plane that is spanned by the x-direction and the y-direction of the coordinate system K. Another front surface section 20b is inclined relative to the back surface section 20a of the first reference plane 20 and in doing so, extends parallel to the y-direction.

For a mechanical connection the measurement arm receptacle device 18 comprises a holding device 25 that cooperates with a counter holding device 26 of the measurement arm 16 for establishing the releasable connection. The holding device 25 comprises a support device 27 that cooperates with a counter support device 28 of the measurement arm in order to predefine a defined relative position and relative orientation between the measurement arm 16 and the measurement arm receptacle device 18 when the connection is established. According to the example, the support device 27 defines a first support location 30, a second support location 31 and a third support location 32, wherein each support location is arranged either directly adjacent to or in the first reference surface 20 or second reference surface 21. The first support location 30 is formed by a conically narrowing support cavity 33. Starting from the first reference surface 20 and according to the example, the back surface section 20a, the support cavity 33 narrows to the inside of the receptacle body 19. It provides a truncated cone skin surface-like support surface for a respective counter support location for the counter support device 28. The support surface can be arranged at a conical insert part that is inserted into the receptacle body.

According to the example, the second support location 31 is formed by a groove-shaped support cavity 34. In the embodiment the groove-shaped support cavity 34 is created in that two support pins 35 are arranged directly adjacent to each other and that the groove-shaped support cavity 34 is limited between the two support pins 35. The two support pins 35 are arranged in a respective cavity 36 of the receptacle body 19 that is open toward the first reference surface 20. Thus, the groove-shaped support cavity 34 is also open toward the first reference surface 20. According to the example, the support pins 35 and the cavity 36 is located in the front section of the receptacle body 19 and adjoin the front surface section 20b of the first reference surface 20. According to the example, the support cavity extends in an x-z-plane orthogonal to the y-direction.

The third support location 32 is formed at the second reference surface 21 and according to the embodiment formed by a preferable planar support surface that is present at support insert 37. According to the example, the support surface is orientated in the x-z-plane. The support surface of the support insert 37 can be located in the same plane as the second reference surface 21 or can be slightly shifted therefrom.

Figure 7:
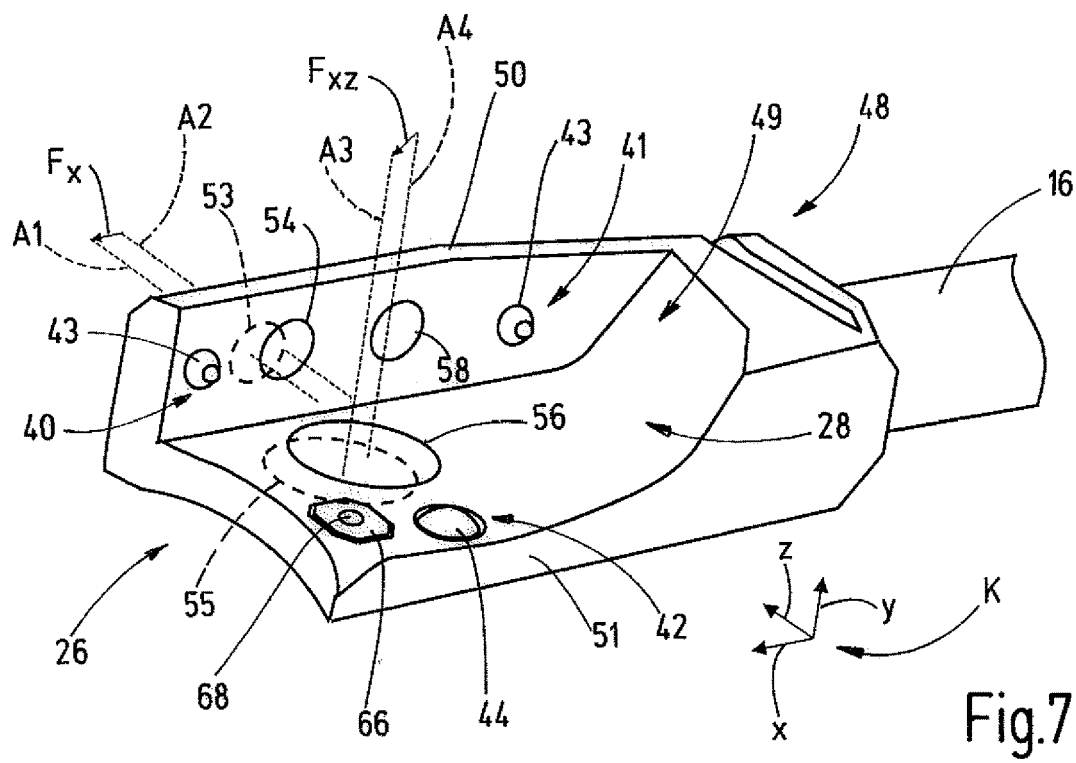

The counter support device 28 is particularly shown in FIG. 7. It comprises a first counter support location 40, a second counter support location 41 and a third counter support location 42. The first counter support location 41 is configured to cooperate with the first support location 30. The first counter support position 31 comprises a support projection 43 that is configured to match with the conical support cavity 33 in a way that a contact at least at three points and according to the example, a line-shaped contact along a closed circular path is created when the holding device 25 is connected with the counter holding device 26. For example, the support projection 43 can have a spherical or at least in section spherical outer surface.

According to the example, the second counter support location 41 is also formed by a support projection 43 that is configured identically or similar to the support projection 43 of the first counter support location 40. The support projection 43 of the second counter support location 41 is configured to engage into the groove-shaped support cavity 34 and to establish a point-like contact with each of the two flanks of the groove-shaped support cavity 34 that is formed by the support pins 35, according to the example.

According to the embodiment the third counter support location 42 comprises a ball 44 or a ball scraper that also forms a support projection and is configured for abutment with the support surface of the support insert 37. Between the support projection of the third counter support location 42 and the support surface of the third support location 32, a point-shaped contact is created when the connection between the support device 27 and the counter support device 28 is established. Instead of a ball 44 or a ball scraper, also another convex curved support projection can be present at the third counter support location 42.

If the support device 27 and a counter support device 28 are in connection with each other, the support projection 43 of the first counter support location 40 engages into the conical support cavity 33 of the first support location 30 and defines the position between the measurement arm 16 and the measurement arm receptacle device 18 in three space directions x, y and z of the coordinate system K. The support projection 43 of the second counter support location 41 engages into the groove-shaped support cavity 34 and defines the pivot position about the z-direction and the y-direction of the coordinate system K, due to the contact between the second support location 31 and the second counter support location 42 when the connection is established. Thus, only one single degree of freedom remains, namely the pivot position about the x-direction. This degree of freedom is defined by the contact between the third support location 32 and the fourth support location 42. In doing so, a statically unambiguously defined relative location (position and orientation) between the measurement arm receptacle device 18 and the measurement arm 16 is achieved by the support device 27 and the counter support device 28.

As can be seen in FIG. 7, the measurement arm 16 comprises at its end opposite the measurement element 17 a mounting section 48. The mounting section has a mounting cavity 49 that is at least open at three sides, in which the receptacle body 19 engages when the connection between the measurement arm receptacle device 18 and the measurement arm 16 is established. The mounting cavity 49 is limited at one side by a first wall 50 and at another side by a second wall 51. In the first wall 50 the first counter support location 40 and the second counter support location 41 are arranged. Matching the two surface sections 20a and 20b the first wall 50 can comprise two wall sections that extend inclined with regard to each other. The second wall 51 extends substantially orthogonal to the first wall 50. At the second wall 51 the third counter support location 42 is arranged.

It has to be noted that no further mechanical parts are present between the holding device 25 and the counter holding device 26 that could hinder the defined abutment between the support device 27 and the counter support device 28 when the connection between the holding device 25 and the counter holding device 26 is established.

The holding device 25 and/or the counter holding device 26 further comprise means in order to create a retaining force between the measurement arm receptacle device 18 and the measurement arm 16. The retaining force can be created in a way that the support device 27 and the counter support device 28 maintain a defined relative location during the measurement. In the embodiment described herein the retaining force is created by at least one magnetic force.

According to the example, the measurement arm receptacle device 18, as well as the measurement arm 16, each comprise at least one retaining magnet. In the preferred embodiment a plurality of retaining magnets are present at the measurement arm receptacle device 18 and the measurement arm 16 respectively. In the embodiment three magnet pairs are formed by
- a first retaining magnet 53 and a second retaining magnet 54;
- a third retaining magnet 55 and a fourth retaining magnet 56;
- a fifth retaining magnet 57 and a sixth retaining magnet 58.

Figure 6:
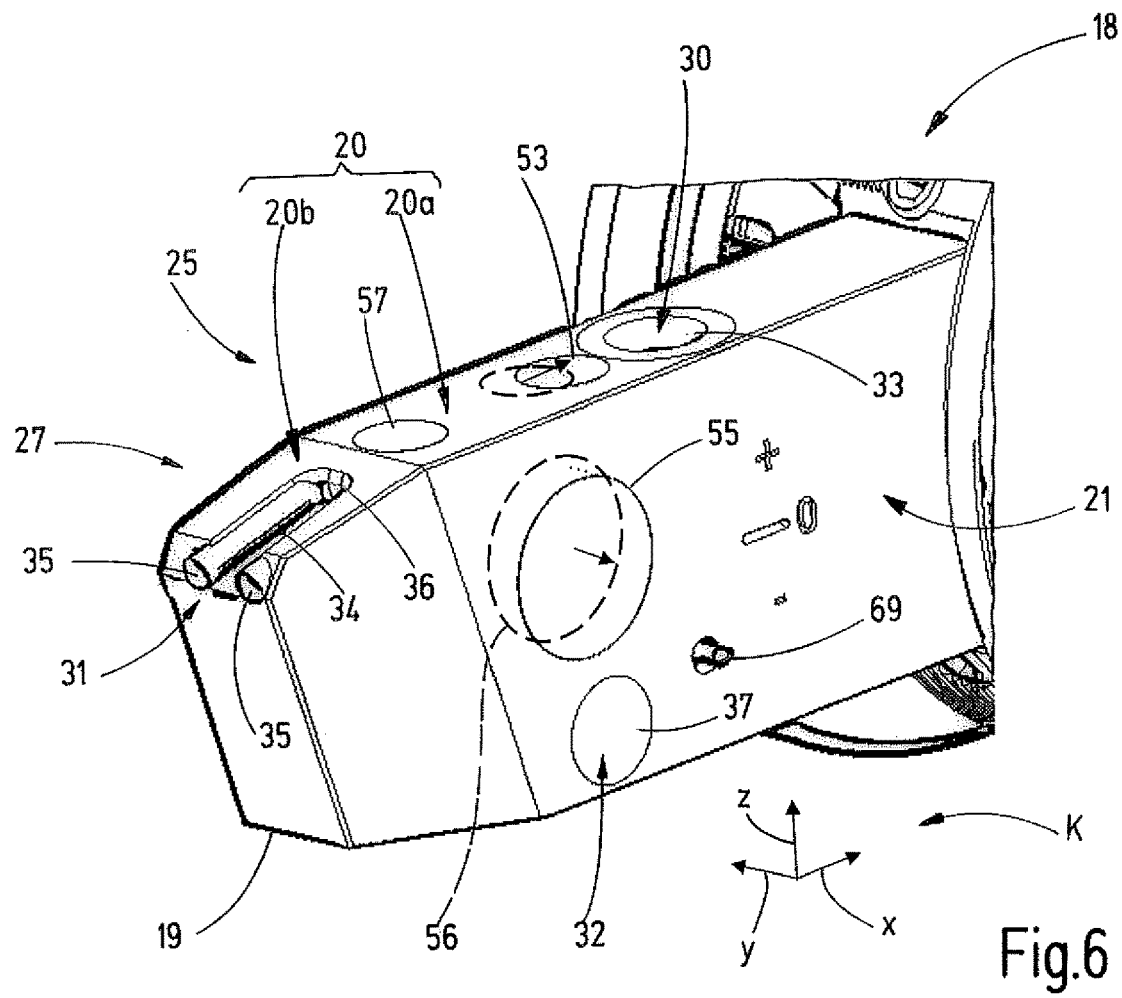
Figure 12:
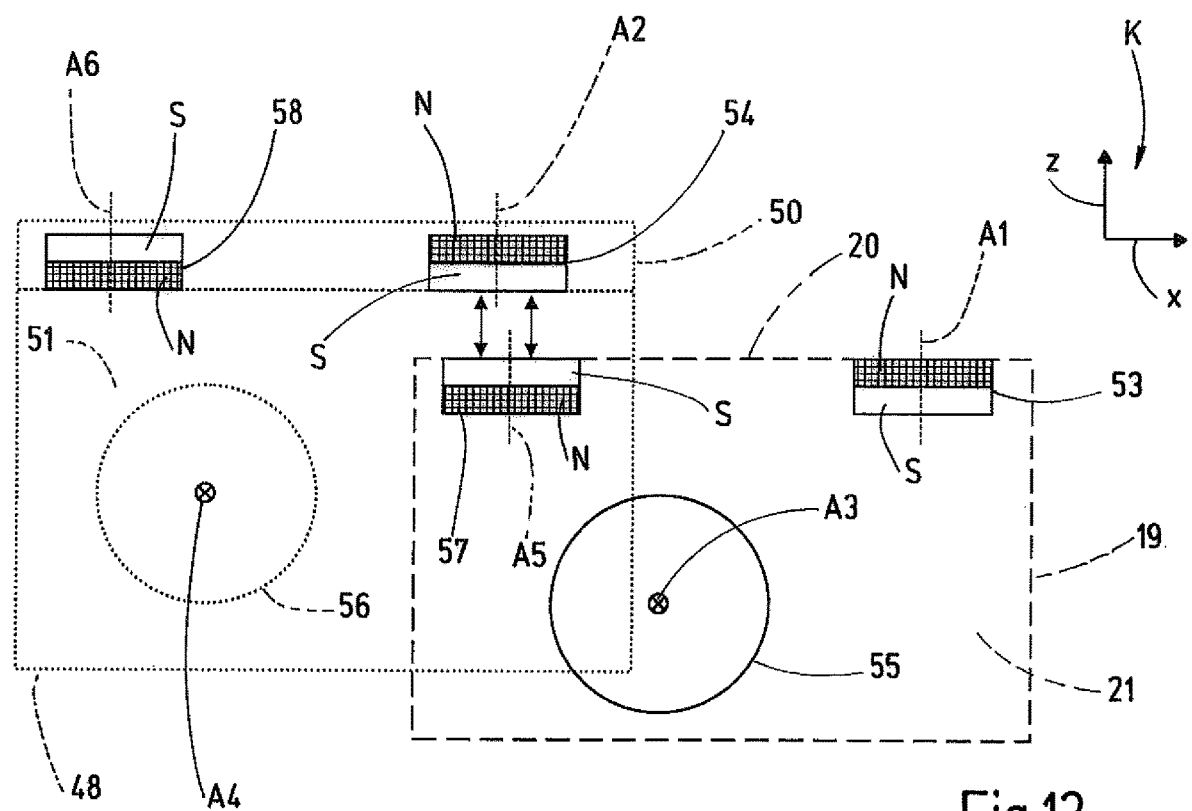
Figure 13:
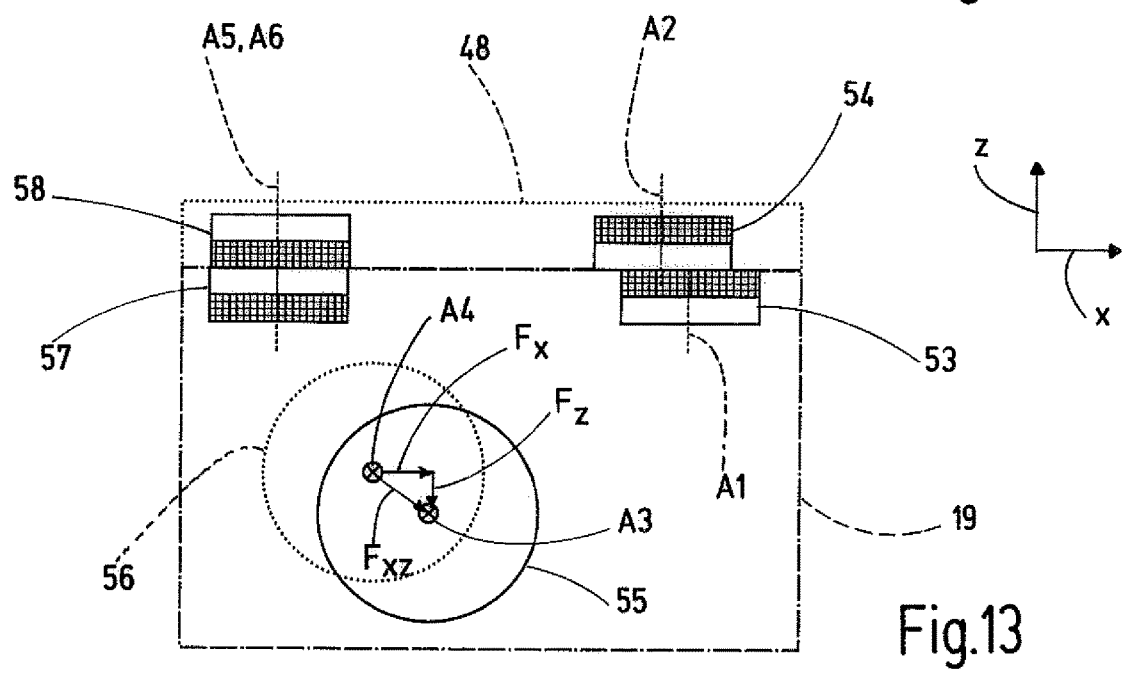

As illustrated in FIGS. 6, 12 and 13, the first retaining magnet 53 having a first magnet axis A1 is arranged directly adjacent to the first reference surface 20 of the receptacle body 19. In the embodiment the first magnet axis A1 corresponds to the longitudinal center axis of the first retaining magnet 53. In the embodiment the first retaining magnet 53 has a cylindrical shape and preferably a cylindrical shape with a circular cross-section. A north pole N and a south pole S of the first retaining magnet 53 are arranged along the first magnet axis A1 in a row. In the embodiment the first magnet axis A1 extends in z-direction of the coordinate system K. The first retaining magnet 53 is arranged between the first support location 30 and the second support location 31 and in doing so, closer at the first support location 30 and according to the example, adjoins at the first support location 30 or the conical support insert.

Adjoining the first reference surface 20 and according to the example, adjoining at the back surface section 20a, the fifth retaining magnet 57 is also arranged between the first support location 30 and the second support location 31. Its fifth magnet axis A5 extends parallel to the first magnet axis A1 according to the example. In the embodiment the fifth retaining magnet 57 is configured identically or similar to the first retaining magnet 53.

The fifth retaining magnet 57 is arranged closer to the second support location 31 as to the first support location 30.

Additionally, the third retaining magnet 55 is provided at the receptacle body 19 directly adjoining the second reference surface 21. The third magnet axis A3 of the third retaining magnet 55 extends obliquely and according to the example orthogonal to the first magnet axis A1 and the fifth magnet axis A5 and according to the embodiment in y-direction of the coordinate system K.

A retaining magnet 54, 56, 58 at the mounting section 48 of the measurement arm 16 is assigned to each retaining magnet 53, 55, 57 arranged at the receptacle body 19. According to the example, the second retaining magnet 54 and the sixth retaining magnet 58 are arranged in the first wall 50 adjacent to the mounting cavity 49. The second magnet axis A2 of the second retaining magnet 54 and the sixth magnet axis A6 of the sixth retaining magnet 58 extend parallel to each other in the embodiment.

The fourth retaining magnet 56 is arranged in the second wall 51 of the mounting section 48. The fourth magnet axis A4 extends orthogonal to the extension direction of measurement arm 16 according to the example and thus orthogonal to the measuring direction Mx, Mz. The second magnet axis A2 and the fourth magnet axis A4 extend also orthogonal to the extension direction of the measurement arm 16 according to the example. The fourth magnet axis A4 of the fourth retaining magnet 56 is orientated orthogonal to the second magnet axis A2 and the sixth magnet axis A6. The fourth magnet axis A4 extends in y-direction of the coordinate system K and according to the example, parallel to the rotation axis D, if the connection between the measurement arm 16 and the measurement arm receptacle device 18 is established. The second magnet axis A2 and the sixth magnet axis A6 are orientated in z-direction of the coordinate system K, if the connection is established.

In all of the magnets the respective magnetic north pole N and the respective magnetic south pole S are arranged along the respective magnet axis adjacent to each other. According to the example, all of the retaining magnets have a cylindrical shape and preferably a circular cross-section. The magnet axes correspond to the respective longitudinal center axis. The magnetic north poles N are illustrated in FIGS. 12 and 13 with diamond hatch. The magnetic south poles S are illustrated in FIGS. 12 and 13 by non-filled white areas.

For creating the retaining force one north pole N of a retaining magnet cooperates with one south pole S of a respective other retaining magnet of a common magnet pair respectively. Due to the attraction force, the measurement arm 16 is retained at the measurement arm receptacle device 18 or the receptacle body 19.

As illustration in FIG. 12, the first retaining magnet 53 and the fifth retaining magnet 57 are arranged in z-direction with inverse arrangement of the magnetic poles in the receptacle body 19. According to the example, a face of the north pole N of the first retaining magnet 53 is arranged adjacent to the first reference surface 20, whereas a face of the south pole S of the fifth retaining magnet is arranged adjacent to the first reference surface 20. The second retaining magnet 54 at the mounting section 48, that is assigned to the first retaining magnet 53, is arranged in the first wall 50 in a way that the south pole S is facing the mounting cavity 49, whereas the north pole N of the sixth retaining magnet 58 faces the mounting cavity 49. Different to this embodiment, all of the retaining magnets 53, 54, 57, 58 could be arranged in the respective inverse orientation of the magnetic poles.

Due to the arrangement in an opposite sense so to speak of the first retaining magnet 53 and the fifth retaining magnet 57, it is achieved that no attraction force between the second retaining magnet 54 and the fifth retaining magnet 57 is created during connection of the mounting section 48 with the receptacle body 19, but on the contrary, a magnetic repulsion is created between the two similar magnetic poles, the south poles S according to the example. The repulsion is schematically illustrated in FIG. 12 by double arrows. In doing so, it is avoided that already an attraction force occurs between the second retaining magnet 54 and the fifth retaining magnet 57 and the measurement arm 16 is unintentionally arranged in an erroneous relative position at the measurement arm receptacle device 18. Only when the second retaining magnet 54 reaches the proximity of the third retaining magnet 55 and the sixth retaining magnet 58 reaches the proximity of the fifth retaining magnet 57, the retaining force or magnetic force is created in order to establish a mechanical connection. In doing so, the precise orientation is defined by the support device 27 and the counter support device 28, as it is explained above. The respectively assigned retaining magnets of one magnetic pair do not directly abut, if the connection is established, but are arranged with a slight distance to each other in order to not impede the precise orientation by support device 27 and the counter support device 28.

The arrangement of the magnetic poles for the third retaining magnet 55 and the fourth retaining magnet 56 is not explicitly illustrated in FIGS. 12 and 13. For example, the magnetic north pole N of the third retaining magnet 55 can be arranged directly adjacent to the second reference surface 21, wherein the magnetic south pole S of the fourth retaining magnet 56 is facing the mounting cavity 49. Also a respective inverse arrangement of the magnetic poles is possible.

In FIGS. 6, 7 and 13 it is further schematically illustrated that a parallel displacement between the first magnetic axis A1 of the first retaining magnet 53 and the second magnet axis A2 of the second retaining magnet 54 remains, if the connection is established. Due to this displacement, not only a magnetic attraction force parallel to the magnet axis A1, A2 is created, but additionally a magnetic force component Fx orthogonal to the magnet axes A1, A2 and according to the example in x-direction of the coordinate system K is created.

According to the example, also a parallel displacement between the third magnet axis A3 and the fourth magnet axis A4 exists. The third magnet axis A3 and the fourth magnet axis A4 are displaced parallel to each other and orthogonal to the y-direction of the coordinate system K. In doing so, not only an attraction force in y-direction is created between the third retaining magnet 55 and the fourth retaining magnet 56, but additionally also a magnetic force component Fx in x-direction and/or a magnetic force component in Fz in z-direction is created, wherein these two additional components commonly yield to a magnetic force component Fxz (compare particularly FIG. 13).

In the embodiment described herein no retaining magnets are present having magnet axes that extend substantially or exactly in x-direction. Magnetic force components in x-direction are created in that a respective displacement between the magnet axes A1, A2 and A3, A4 of the retaining magnets 53, 54 or 55, 56 associated to each other exists, if the connection between the holding device 25 and the counter holding device 26 is established. In doing so, the number of magnetic pairs can be reduced. Generally, it may be sufficient that one single magnet pair is present that creates a magnetic force with force components in all three directions x, y, z of the Cartesian coordinate system K. In the embodiment discussed herein such a magnetic force is created by a magnet pair consisting of the third retaining magnet 55 and the fourth retaining magnet 56. The two retaining magnets 55, 56 attract in y-direction and due to the displacement of the magnet axis, additional magnetic force components in x- and z-direction are created. The magnet pairs that are additionally present are provided in order to obtain a sufficiently high magnetic force in all three space directions. A fine tuning of the magnetic force or the magnetic force components can be defined by the amount of the distance of the magnet axes of a magnet pair and/or the distance of the retaining magnets of a common magnet pair parallel to the magnet axes when the connection is established.

As it is particularly illustrated in FIG. 13, the fifth magnet axis A5 and the sixth magnet axis A6 are orientated coaxially to each other, i.e. they are congruent, if the connection is established. It is thus not necessarily required that the two retaining magnets of each magnet pair are arranged offset. In modification to the illustrated embodiment also a displacement of the fifth magnet axis A5 and the sixth magnet axis A6 could be provided, if the connection is established, e.g. in y-direction and/or x-direction.

The measurement arm receptacle device 18 also comprises an electric contact device 65 in order to be able to create an electric connection to the measurement arm 16 and particularly to the mounting section 48 of the measurement arm 16. This is particularly advantageous with measurement arms 16 that comprise a data carrier 66, on which at least one indication with regard to the measurement arm 16 is stored. The indication can be used, e.g. for identification of the measurement arm or the type of measurement arm. Also technical data can be stored, e.g. the length of the measurement arm 16 (i.e. the distance between the rotation axis D and the measurement element 17), the weight of the measurement arm or the like. It is, however, sufficient to store an indication for characterizing the measurement arm type on the data carrier 66 in order to transmit this information to an evaluation device 67 of the measurement system 15. The evaluation device 67 can use the information in order to control the measurement system 15 dependent from the actually arranged measurement arm 16 at the measurement arm receptacle device 18. The evaluation device 67 can be part of a control device of the measurement system 15.

A measurement arm contact 68 is provided adjacent to the mounting cavity 59, e.g. in the second wall 51. According to the example, the measurement arm contact 68 is electrically connected with the data carrier 66. In the embodiment described herein the data carrier 66 is a chip, wherein the measurement arm contact 68 is directly arranged at the chip in the form of a contact surface.

Figure 9:
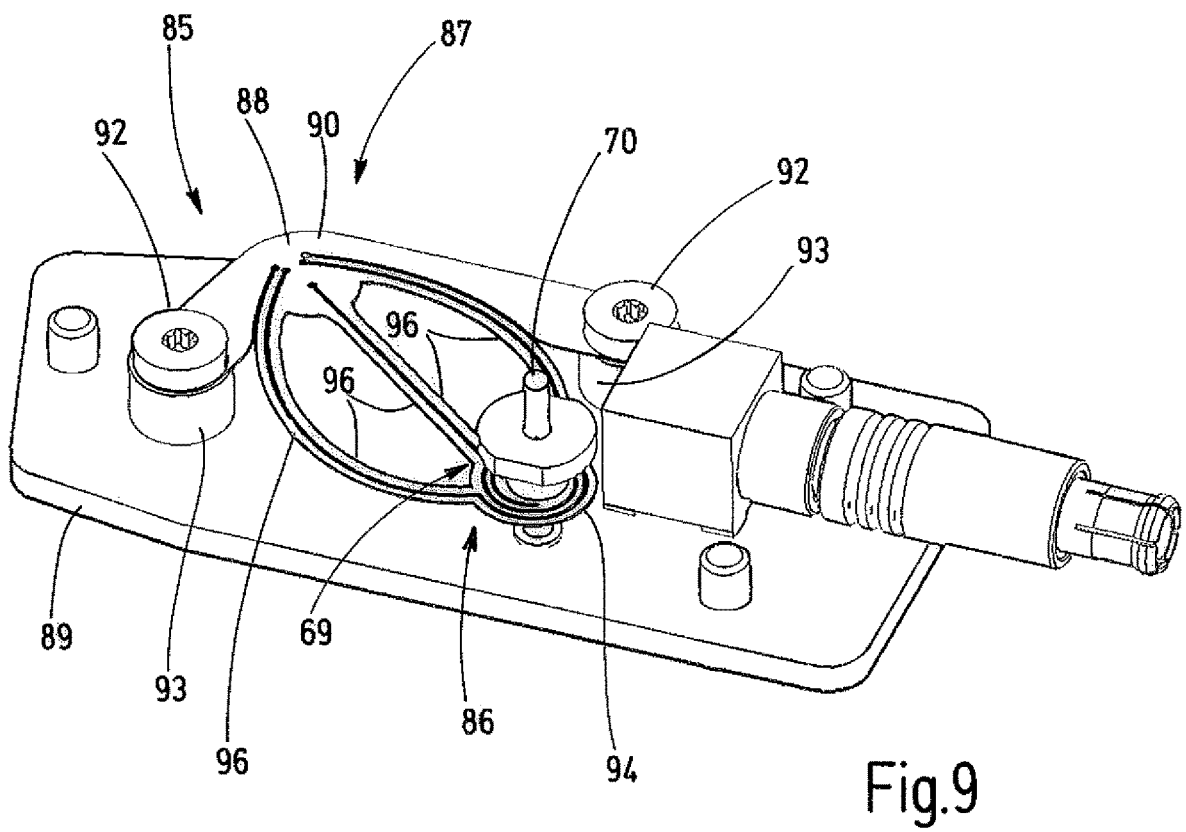

A contact device 65 of the measurement arm receptacle device 18 comprises a contact part 69 in order to be able to establish an electric connection with the measurement arm contact 68. The contact part 69 can consist of a single integral electrically conductible part. In the embodiment the contact part 69 is built from several and according to the example, two separate electrically conductible parts, namely a contact pin 70 and an electrically conductible contact sleeve 71 that is mechanically connected with the contact pin 70 and that surrounds the contact pin 70 coaxially to its longitudinal axis L (FIGS. 9-11) and that can be screwed onto the contact pin for example.

Figure 10:
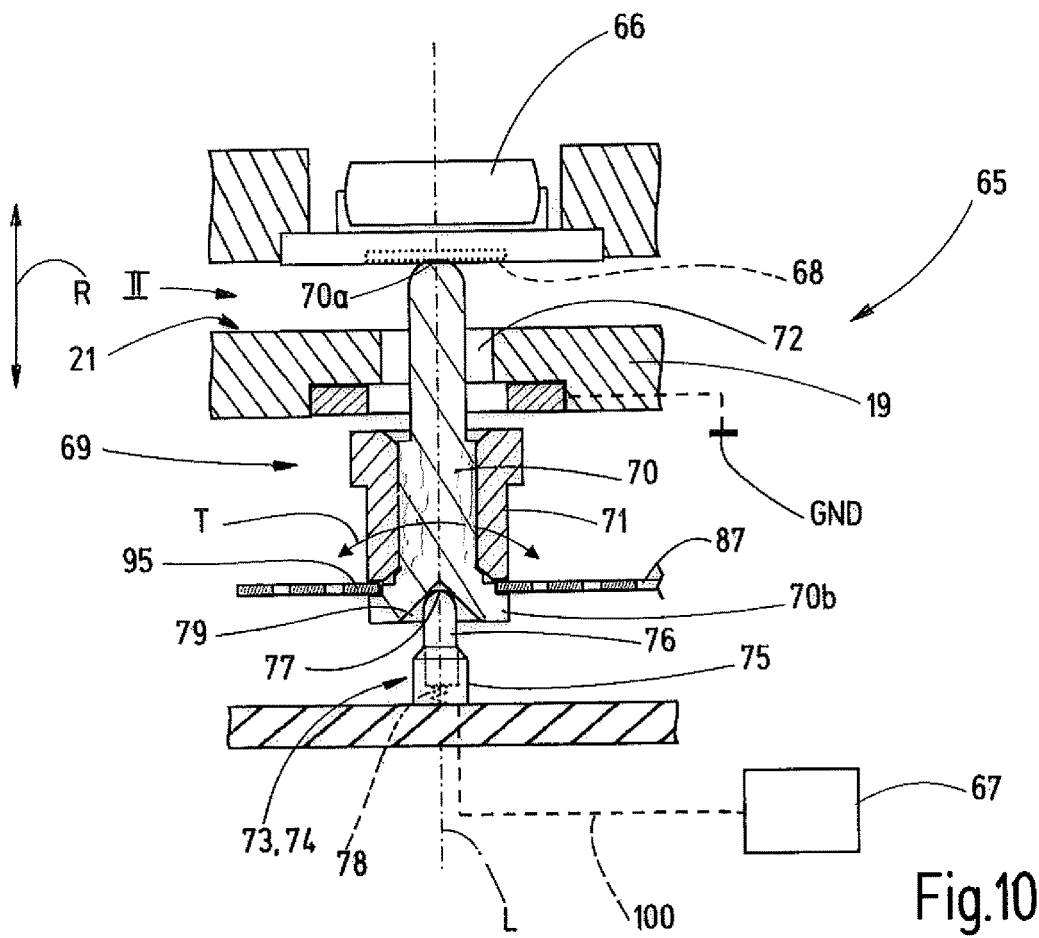
Figure 11:
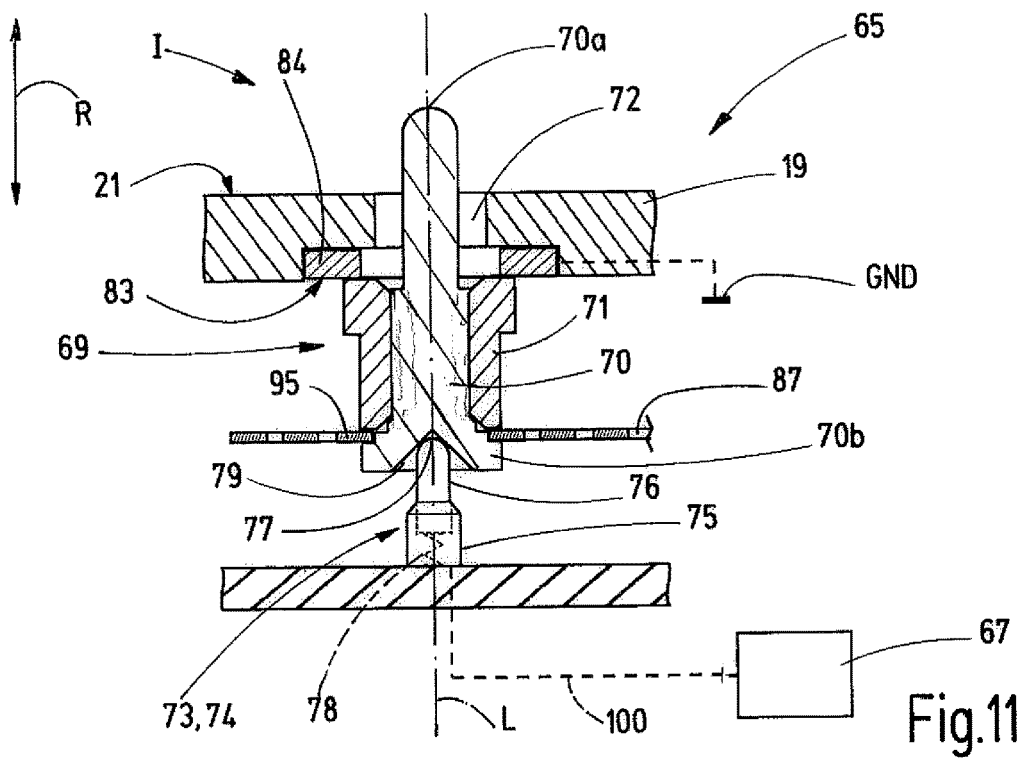

The contact part 69, e.g. the contact pin 70, extends partly through a through-hole 72 out of the receptacle body 19, such that its free end 70a is arranged outside the receptacle body 19 and projects according to the example beyond the second reference surface 21 (FIGS. 6, 10 and 11). With the free end 70a of the contact pin 70 the contact part 69 can be brought into abutment with the measurement arm contact 68 in order to create an electric connection between the contact part 69 and the measurement arm contact 68.

The contact part 69 is moveable between a rest position I (FIG. 11) and a working position II (FIG. 10). The end section of the contact pin 70 adjoining the free end 70a that extends beyond the second reference surface 21 from the receptacle body 19 is longer in the rest position I than in the working position II.

At the side opposite the free end 70a the contact part 69 is exposed to a biasing force by a biasing means that acts into a normal direction R. In the rest position I the normal direction R is orientated parallel to the longitudinal axis L, if no force is applied onto the contact part 69 transverse to its longitudinal direction. The normal direction R is preferably orientated orthogonal to the surface of the measurement arm contact 68, if the measurement arm 16 is arranged at the measurement arm receptacle device 18 (FIG. 10).

In the embodiment the biasing means 73 creating the biasing force in normal direction R is formed by a spring contact 74. The spring contact 74 has a spring contact sleeve 75, in which a spring contact pin 76 is shiftably arranged in normal direction R. The spring contact pin 76 extends with a section adjoining to the outer end 77 from the spring contact sleeve 75. In the spring contact sleeve 75 a force generating element is arranged that creates the biasing force and urges the spring contact pin 76 with the biasing force out of the spring contact sleeve 75 according to the example. In the embodiment the force generating element is a spring element 78.

According to the example, the outer end 77 is configured in the form of a spherical segment or a hemisphere and defines a rotation or wobbling point for the contact part 69 and according to the example, the contact pin 70, the rotation or wobbling point being defined by the center point of the spherical segment. At the end opposite the free end 70a, the contact part 69 and according to the example, the contact pin 70, is supported at the spring contact pin 76. For this a contact pin 70 has a conical cavity 79. Inside the conical cavity 79 the spherical surface of the outer end of the spring contact pin 76 thus abuts at a circular-shaped line about the longitudinal axis L of the contact pin 70 at the contact pin 70. The contact pin 70 and thus the contact part 69 is moveable in all three rotational degrees of freedom about the rotation or wobbling point defined by the spring contact pin 76, which is schematically illustrated in FIG. 10 by the double arrow that exemplarily illustrates a wobbling movement T. During this wobbling movement T the longitudinal axis L is inclined relative to the normal direction R about a common intersection point between the longitudinal axis L and the normal direction R that forms a rotational wobbling point.

The contact part 69 is urged against a stop surface 83 in the rest position I. According to the example, the contact sleeve 71 abuts against the stop surface 83. The stop surface 83 is formed as a ring surface at a ring part 84 that is aligned with the through-hole 72 or surrounds the through-hole 72 at an inner aperture in a ring-shaped manner. The ring part 84 must not necessarily be shaped as a circular ring. A through-opening is sufficient that is aligned with the through-hole 72, such that the contact part 69 and according to the example, the contact pin 70 can extend through the through-opening and the through-hole 72.

According to the example, the stop surface 83 at the ring part 84 is configured as electrically conductible surface. For example, the ring part 84 can be configured as circuit board with an electrically conductible surface, at which the contact sleeve 71 abuts in the rest position I. The stop surface 83 is electrically connected with a reference potential. According the example, the reference potential is a ground potential GND. Thus the contact part 69 is electrically connected with the ground potential GND in the rest position I.

Also a electric spring contact could be present that is radially effective and that abuts at the contact part 69 in the rest position I in order to electrically connect the contact part 69 in the rest position I with the reference potential and according to the example, the ground potential GND. The electric connection with the reference potential (ground potential GND) via the stop surface 83 is the preferred, but not the only possibility to realize this electric connection.

A contact part support device 85 is present to support the contact part 69, such that the spring contact pin 76 remains in engagement with the conical cavity 79. The contact part support device 85 is configured to allow the contact part 69, the wobbling movement T and/or the movement transverse to the normal direction R. According to the example, the contact part support device 85 allows a tilting of the longitudinal axis L relative to the normal direction R, as explained above.

In the embodiment the contact part support device 85 has a solid body support 86. The solid body support 86 is preferably formed by a leaf spring 87, the configuration of which is particularly illustrated in FIG. 9. The leaf spring 87 has a fastening section 88, with which it is fixedly connected with a support plate 89, e.g. a circuit board, according to the example by means of a screw connection. In the rest position I the leaf spring 87 extends substantially in a plane that is orientated orthogonal to the normal direction R and/or to the longitudinal axis L. In the normal direction R no or only a negligible small force is created in normal direction R by the leaf spring 87 compared with the biasing force of the biasing means 73. The fastening section 88 comprises a connection area 90 from which two arms 91 extend away in different directions and according to the example, substantially orthogonal to each other. At an end opposite to the connection area 90, each of the arms 91 are fixed on a foot 93 by means of a fastening screw 92. The feet 93 are fixedly connected with the support plate 89. The height of the feet 93 starting from the support plate 89 is equal.

Additionally, the leaf spring 87 comprises a coil spring section 94, wherein the leaf spring extends from an outer winding with decreasing radius and increasing curvature to an inner winding 95. At the inner winding 95 the coil spring section 94 is connected with the contact part 69 and, for example, held by clamping between the contact sleeve 71 and an end flange 70b of the contact pin 70. For example, the contact sleeve 71 can be screwed onto the contact pin 70, such that the inner winding 95 can be clamped axially between the contact sleeve 71 and the end flange 70b by the screw connection.

The coil spring section 94 is connected with the fastening section 88 and according to the example, with the connection area 90 via at least one and according to the example via a plurality of spring ligaments. According to the embodiment, the spring ligaments 96 are arranged in pairs respectively, wherein the two spring ligaments 96 of one pair are separated by a slot and extend parallel to each other. The middle pair of two ligaments 96 extends substantially straight from the connection area 90 to the coil spring section 94. On both sides of this middle pair one additional pair of two spring ligaments 96 is arranged respectively, each having an arc-shaped curved extension. In the middle section between the connection area 90 and the coil spring section 94 the two arc-shaped pairs of spring ligaments 96 have the largest distance from each other and approach each other starting from this middle section toward the connection area 90 as well as toward the coil spring section 94. Each spring ligament 96 is connected with one of the windings in the coil spring section 94, wherein a plurality of the spring ligaments 96 can also be connected with the same winding.

The leaf spring 87 is preferably integrally configured as one piece without seam and connection location. In doing so, it can be separated from a plate-shaped or foil-shaped initial part by means of a separation process.

In the embodiment the contact part 69 is electrically connected with the evaluation device 67 in the rest position I as well as in the working position II. According to the example, this is achieved by the electric connection of the spring contact 74 with the evaluation device 67 via an electric conductor 100. The spring contact 76 is electrically conductible and abuts against the contact part, such that an electric connection is established between the contact part 69 and the conductor 100 and thus the evaluation device 67.

The contact part 69 is moved out of the rest position I in the working position II, if the connection between the holding device 25 and the counter holding device 26 is established. The movement in the working position II is carried out, because the measurement arm contact 78 abuts against the free end 70a of the contact pin 70 and moves it against the biasing force of the biasing means 73 and according to the example, the spring contact 74 in working direction II. In the working direction II the electric connection between the contact part 69 and the reference potential, according to the example the ground potential GND, is interrupted. The interruption of this electric connection is carried out, because the contact part 69 is moved away from the stop surface 83, if it is located in the working position II (FIG. 10). The contact part 69 abuts at the measurement arm contact 68 via the contact pin 70, such that an electric connection between the evaluation unit 67 and the measurement arm contact 68 and thus the data carrier 66 (e.g. chip) is established. Thus in the working position II the evaluation device 67 can readout information stored on the data carrier 66.

Because the contact part support device 85 does not effect a precise guiding of the contact part 69 in normal direction R, but rather allows a movement in at least one rotational or linear degree of freedom additionally to the movement in normal direction R, the free end 70a of the contact pin 70 is not always abutted exactly against the same location at the measurement arm contact 68. Rather during arrangement of the measurement arm 16 at the measurement arm receptacle device 18 a transverse or wobbling movement T of the contact part 69 is effected, such that the free end 70a can slide along the surface of the measurement arm contact 68 until it takes its final position. In doing so, it is avoided that smaller dirt particles hinder a reliable electric contacting between the contact part 69 and the measurement arm contact 68. Such dirt particles are removed due to the sliding movement between the free end 70a of the contact pin 70 and the measurement arm contact 68.

By evaluation of the electric potential at the contact part 69 or the electric conductor 100 the evaluation device 67 can determine, whether a measurement arm 16 is arranged at the measurement arm receptacle device 18. If no measurement arm 16 is present, the contact part 69 takes the rest position I and is electrically connected with the reference potential and according to the example, the ground potential GND. In the deflected working position II the connection to the ground potential GND is interrupted and the contact part abuts against the measurement arm contact 68. If at the conductor 100 no ground potential GND is recognized, the evaluation device 67 can conclude that a measurement arm 16 is arranged at the measurement arm receptacle device 18 and readout of information on the data carrier 66 can be carried out. For example, the readout of information can be automatically started, if the electric potential at the conductor 100 is changed in a way that it is no longer equal to the reference potential (here: ground potential GND).

Figure 8:
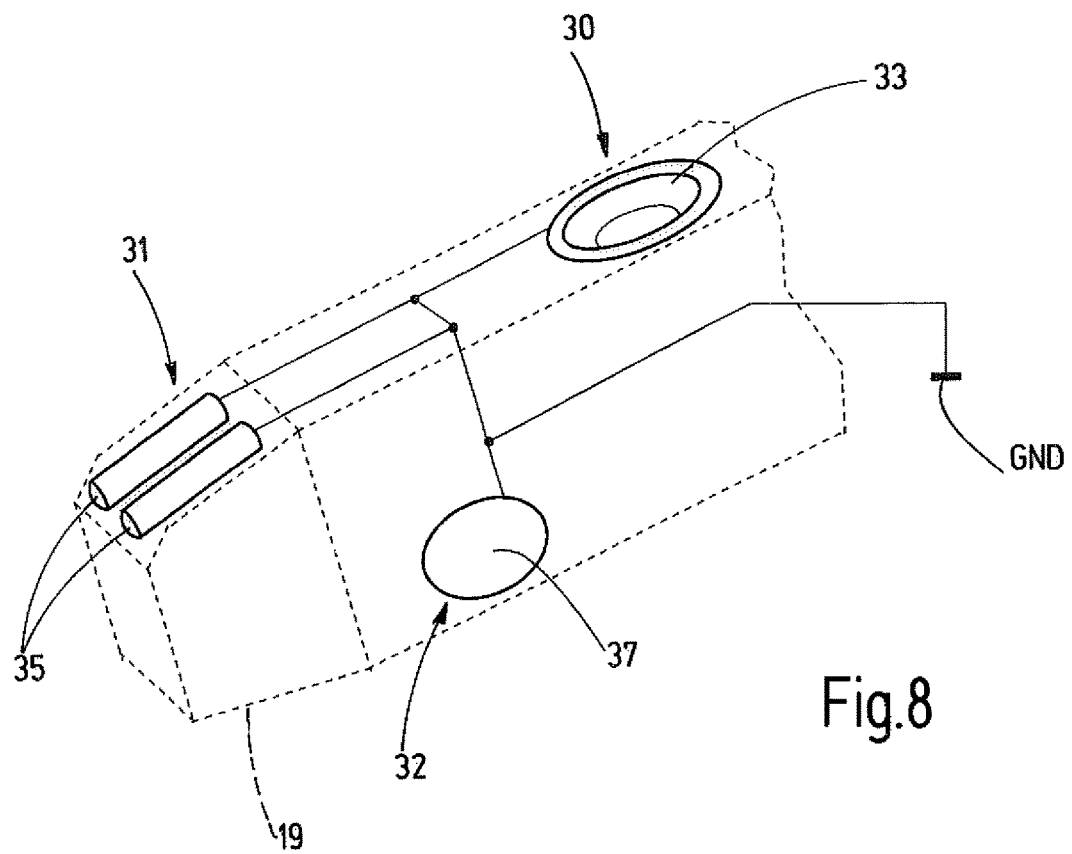

It can be necessary to provide a reference potential, and according to the example a ground potential GND, to the data carrier, such that it is electrically connected with the ground potential GND via a respective connection. According to the example, this is achieved by connecting one or more support locations 31, 32, 33 of the support device 27 with the ground potential GND, which is schematically shown in FIG. 8. Preferably at least two or all three support locations 31, 32, 33 are electrically connected with the ground potential GND. For this purpose the support pins 35 and/or the insert 37 and/or a conical insert forming the conical support cavity 33 is at least partly made of electrically conductible material. In accordance to this the associated support projections 43 or the ball 44 of the counter support device 28 also consist of electrically conductible material. If the connection is established, then also an electric connection between the respective support location 30, 31, 32 at the measurement arm receptacle device 18 and the counter support location 40, 41, 42 at the measurement arm 16 is created. At least one counter support location and preferably all counter support locations 40, 41, 42 can be electrically connected with a respective connection at the data carrier 66. Because the electric connection for providing the reference potential is established over at least two support locations and associated counter support locations, a redundancy is achieved such that a fault can be excluded with high probability when supplying the reference potential.

Figure 4:
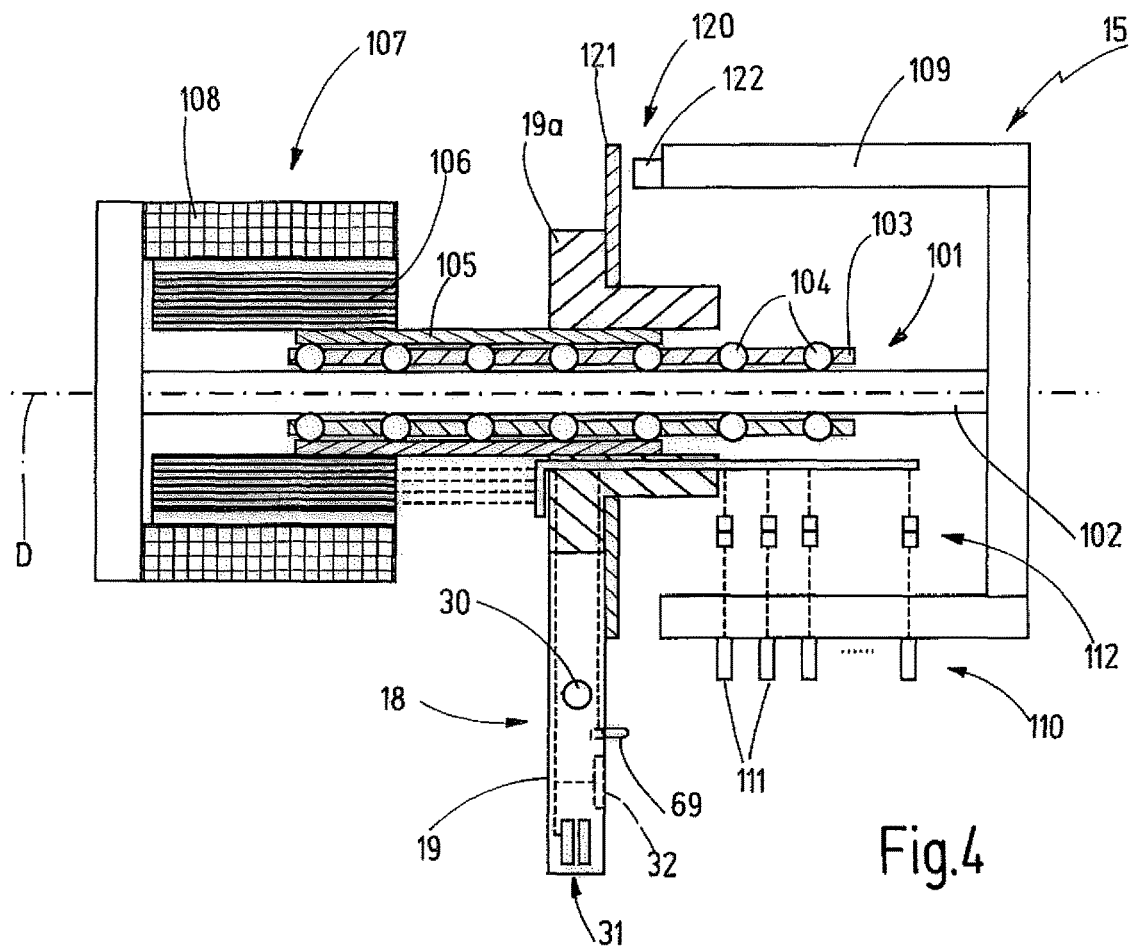

The measurement system 15 is schematically illustrated in FIG. 4. The receptacle body 19 is pivotably supported about the rotation axis D, according to the example by means of the rotatable part 19a. In the embodiment the rotatable part 19a is rotatably supported about the rotation axis D via a ball guide unit 101. The ball guide unit 101 comprises an axle pin 102 that extends along the rotation axis D. Coaxially around the axle pin 102 a ball guide sleeve 103 is arranged that comprises a plurality of ball receptacles, in each of which one ball 104 is arranged. The ball guide sleeve 103 can also be named as ball cage. Additionally, a support sleeve 105 that is coaxially arranged about the ball guide sleeve 103 is part of the ball guide unit 101. The balls 104 allow a roller contact bearing of the support sleeve 105 onto the axle pin 102.

The rotatable part 19a is torque-proof seated on the support sleeve 105. Additionally, a rotor 106 of an electric motor 107 is torque-proof fastened with the support sleeve 105. The stator 108 of the electric motor 107 is torque-proof connected with the axle pin 102.

Additionally, a housing 109 is torque-proof arranged at the axle pin 102. The housing 109 and the electric motor 107 are arranged on different axial sides of the rotatable part 19a.

Figure 5:
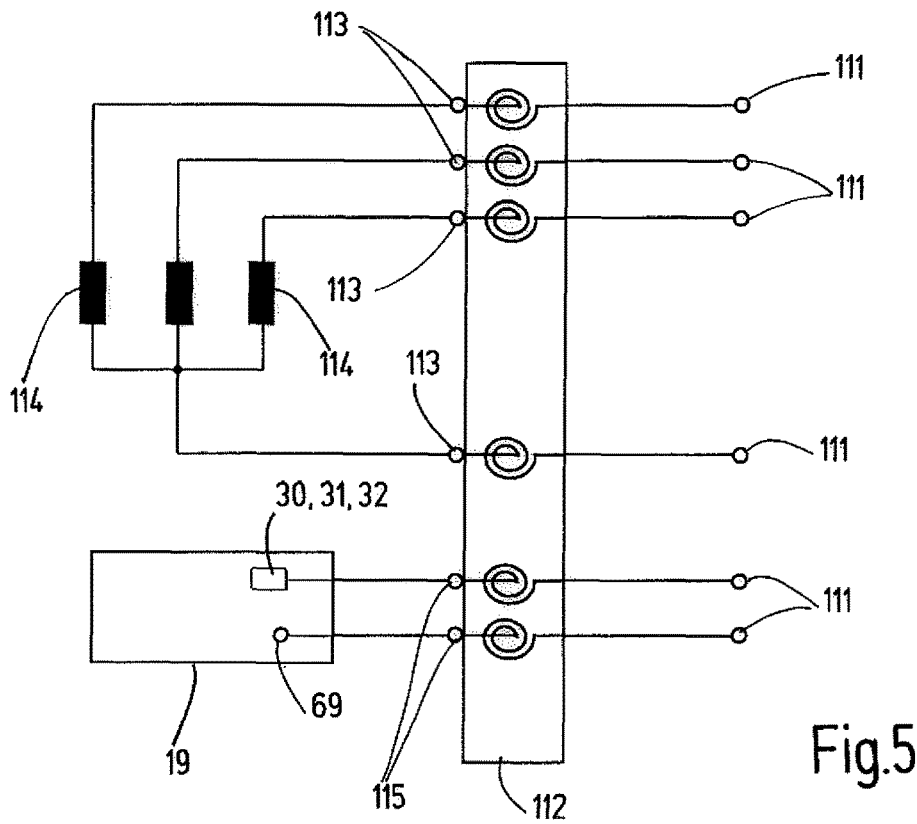

An electric connection device 110 with a plurality of electric connections 111 is arranged at the housing 109. The electric connections 111 are thus torque-proof relative to the axle pin 102. They serve for electric contacting of the measurement system 15 in the measurement apparatus 10. The electric connections 111 of the electric connection device 110 are electrically connected via an electric connection device 112 with winding connections 113 for the rotor windings 114 of the rotor 106 as well as measurement arm receptacle connections 115, that in turn are electrically connected with the contact part 69 or one or more support devices 30, 31, 32 (FIG. 5).

The connection device 112 is configured to allow a relative rotation of the parts that are rotatably supported about the axle pin 102 and particularly of the rotor 106 and the rotatable 19a or the receptacle body 19 relative to the electric connection device 110. For this purpose slidable or rollable electric contacts can be provided for example, e.g. via brush contacts as it is known from electric motors, rotary transmitters or the like. The connection device 112 can also comprise a respective spiral conductor connected with the electric connection 111, the spiral conductor extending in a plane radial to the rotation axis D and being electrically connected with its outer end with a connection 111 and with its inner end either with a winding connection 113 or with a measurement arm receptacle connection with the reference sign 115 after measurement arm receptacle connection. The spiral conductors are only highly schematically illustrated in FIG. 5.

The measurement system 15 additionally comprises a measurement device 120. The measurement device 120 serves to detect the rotation angle position of the measurement arm receptacle device 18 or the receptacle body 19 about the rotation axis D. For example, a scale part 121 can be torque-proof connected with the measurement arm receptacle device 18 and according to the example, the rotatable part 19a for this purpose. At the housing 109 or at another part that is torque-proof relative to the axle pin 102, a detection unit 122 can be arranged that cooperates preferably contactless with the scale part 121, e.g. optically or inductively. During a rotation of the scale part 121 about the rotation axis D the rotation movement can be detected by the detection unit 122 and the actual rotation angle position can be determined.

For measuring the roughness, the geometry or the shape of the object 12, the measurement system 15 is moved in the respective measuring direction Mx, Mz by means of the feed axis 14. During this movement the actual rotation angle position of the measurement arm 16 as well as the position of the measurement system 15 and thus the measurement element 17 in measuring direction Mx or Mz are determined. From the measurement values for the pivot angle position and respective associated position in measuring direction the roughness, the form or the geometry of the object 12 can be determined.

The invention refers to a measurement arm receptacle device 18 of a measurement system 15 for releasably arranging a measurement arm 16. The measurement arm receptacle device 18 can comprise a holding device 25 for this purpose that cooperates with a counter holding device 26 of the measurement arm 16. In one embodiment the holding device 25 as well as the counter holding device 26, respectively comprise at least one retaining magnet. Because the magnet axes of the two retaining magnets extend offset from each other when the connection is established, a magnetic retaining force with a force component is created that extends transverse to the magnet axes. Thus by a single pair of two retaining magnets, a magnetic force can be created with a vector in two or three spacial directions. In a further inventive embodiment the measurement arm receptacle device 18 comprises an electric contact part 66 that can be moved between a rest position I and a working position II. In the rest position I the contact part is electrically connected with an electric reference potential and in the working position II the electric contact part is electrically connected with a measurement arm contact 68 of the measurement arm 16. Thus it can be unambiguously determined via the contact part 69, if a measurement arm 16 is arranged at the measurement arm receptacle device 18 and additionally a data carrier of the measurement arm 16 electrically connected with the measurement arm contact can be read out.

LIST OF REFERENCE SIGNS 10 measurement apparatus
11 surface
12 object
14 feed axis
15 measurement system
16 measurement arm
17 measurement element
18 measurement arm receptacle device
19 receptacle body
19a rotatable part
20 first reference surface
20a back surface section of the first reference surface
20b front surface section of the first reference surface
21 second reference surface
25 holding device 26 counter holding device
27 support device
28 counter support device
30 first support location
31 second support location
32 third support location
33 conical support cavity
34 groove-shaped support cavity
35 support pin
36 cavity
37 support insert
40 first counter support location
41 second counter support location
42 third counter support location
43 support projection
44 ball
48 mounting section
49 mounting cavity
50 first wall
51 second wall
53 first retaining magnet
54 second retaining magnet
55 third retaining magnet
56 fourth retaining magnet
57 fifth retaining magnet
58 sixth retaining magnet
65 contact device
66 data carrier
67 evaluation device
68 measurement arm contact
69 contact part
70 contact pin
70a free end of the contact pin
70b end flange
71 contact sleeve
72 through-hole
73 biasing means
74 spring contact
75 spring contact sleeve
76 spring contact pin
77 outer end of the spring contact pin
78 spring element
79 conical cavity
83 stop surface
84 ring part
85 contact part support device
86 solid body support
87 leaf spring
88 fastening section
89 support plate
90 connection area
91 arm
92 fastening screw
93 foot
94 coil spring section
95 inner winding
96 spring ligament
100 electric conductor
101 ball guide unit
102 axle pin
103 ball guide sleeve
104 ball
105 support sleeve
106 rotor
107 electric motor
108 stator
109 housing
110 electric connection device
111 electric connection
112 connection device
113 winding connection
114 rotor winding
115 measurement arm receptacle connection
120 measurement device
121 scale part
122 detection unit
I rest position
II working position
A1 first magnet axis
A2 second magnet axis
A3 third magnet axis
A4 fourth magnet axis
A5 fifth magnet axis
A6 sixth magnet axis
D rotation axis
Fx magnetic force component in x-direction
Fxz magnetic force component in y-direction
Fz magnetic force component in z-direction
GND mass potential
K coordinate system
L longitudinal axis of the contact pin
Mx horizontal measuring direction
Mz vertical measuring direction
N north pole
R normal direction
S south pole
T wobbling movement
x x-direction
Y y-direction
z z-direction

The invention claimed is:

1. A measurement arm receptacle device (18) of a measurement system (15) for arranging a measurement arm (16), the measurement arm receptacle device comprising:
a holding device (25) for releasably mechanically arranging the measurement arm (16),
an electric contact device (65) that comprises an electric contact part (69) that is moveable between a rest position (I) and a working position (II), wherein the electric contact part (69) is configured to take the rest position (I), if the measurement arm (16) is not arranged on the holding device (25) and wherein the electric contact part (69) is configured to abut against the measurement arm (16) arranged on the holding device (25) and in doing so, to take the working position (II),
wherein the electric contact part (69) is electrically connected with a reference potential (GND) of the electric contact device (65) in the rest position (I), wherein the electric contact part (69) is separated from the electric reference potential (GND) and is electrically connected with an electric conductor (100) in the working position (II), and wherein the electric contact part (69) is additionally configured to establish an electric connection with a measurement arm contact (68) of the measurement arm (16) in the working position (II),
wherein the electric conductor (100) is electrically connected with an evaluation device (67) that is configured to determine whether the electric contact part (69) is in the rest position (I) or in the working position (II).

2. The measurement arm receptacle device according to claim 1, wherein the electric contact part (69) is electrically connected with the electric conductor (100) in the rest position (I).

3. The measurement arm receptacle device according to claim 1, wherein a biasing means (73) creates a biasing force that presses the electric contact part (69) against a stop surface (83) in the rest position (I).

4. The measurement arm receptacle device according to claim 3, wherein the biasing means (73) comprises an electrically conductive spring contact (74).

5. The measurement arm receptacle device according to claim 3, wherein the stop surface (83) is at least partly electrically conductive and is electrically connected with the reference potential (GND).

6. The measurement arm receptacle device according to claim 3, wherein the biasing means (73) creates a force between the electric contact part (69) and the measurement arm (16) in the working position (II) of the electric contact part (69), wherein the force is negligible compared with retaining forces of the holding device (25) for releasably mechanically arranging the measurement arm (16).

7. The measurement arm receptacle device according to claim 1, wherein the electric contact part (69) is moveably supported in a normal direction (R) between the rest position (I) and the working position (II), wherein the normal direction (R) is orthogonal to a surface of a measurement arm contact (68) of the measurement arm (16) arranged on the holding device (25).

8. The measurement arm receptacle device according to claim 7, wherein the electric contact part (69) is rotatably and/or shiftably supported in at least one additional degree of freedom different than the normal direction (R) by a contact part support device (85).

9. The measurement arm receptacle device according to claim 8, wherein the electric contact part (69) is tiltably supported relative to the normal direction (R) and/or shiftably supported transverse to the normal direction (R) by means of the contact part support device (85).

10. The measurement arm receptacle device according to claim 8, wherein the contact part support device (85) comprises a solid body support (86).

11. The measurement arm receptacle device according to claim 10, wherein the solid body support (86) comprises a leaf spring (87) with a coil spring section (94), wherein the leaf spring (87) carries the electric contact part (69).

12. The measurement arm receptacle device according to claim 1, wherein the holding device (25) comprises a support device (27) with at least one support projection and/or at least one support cavity (33, 34) that is configured to cooperate with a counter support device (28) of the measurement arm (16) arranged on the measurement arm receptacle device (18) in order to predefine a statically exactly defined relative position and relative orientation.

13. The measurement arm receptacle device according to claim 12, wherein individual ones of the at least one support projection and/or at least one support cavity (33, 34) of the support device (27) are electrically conductive and are electrically connected with a reference potential (GND) respectively.

14. An arrangement comprising the measurement arm receptacle device (18) according to claim 1 and the measurement arm (16) with a counter holding device (26) that is configured to cooperate with the holding device (25) of the measurement arm receptacle device (18) for arranging the measurement arm (16) at the measurement arm receptacle device (18) and wherein the measurement arm (16) comprises a measurement arm contact (68).

15. The arrangement according to claim 14, wherein the measurement arm contact (68) is electrically connected with a data carrier (66) of the measurement arm (16), on which at least one indication referring to the measurement arm (16) is stored.

16. An arrangement, comprising:
a measurement arm receptacle device (18) of a measurement system (15); and
a measurement arm (16),
wherein the measurement arm receptacle device (18) comprises a holding device (25) and the measurement arm (16) comprises a counter holding device (26), wherein the holding and counter holding devices (25, 26) are configured for cooperation in order to releasably arrange the measurement arm (16) at the measurement arm receptacle device (18), wherein the holding device (25) comprises a first retaining magnet (53) having magnetic poles (N, S) which are arranged along a first magnet axis (A1) in a row,
wherein the counter holding device (26) comprises a second retaining magnet (54) having magnetic poles (N, S) which are arranged along a second magnet axis (A2) in a row and that is associated with the first retaining magnet (53),
wherein the first magnet axis (A1) and the second magnet axis (A2) are not aligned coaxially with each other when the counter holding device (26) is connected with the holding device (25),
and wherein no retaining magnet of the holding device (25) or the counter holding device (26) has a magnet axis that extends in an extension direction of the measurement arm (16) when the measurement arm (16) is arranged on the holding device (25).

17. The arrangement according to claim 16, wherein the holding device (25) comprises a third retaining magnet (55) having magnetic poles (N, S) which are arranged along a third magnet axis (A3) in a row, wherein the first magnet axis (A1) and the third magnet axis (A3) extend inclined to each other, and wherein the counter holding device (26) comprises a fourth retaining magnet (56) having magnetic poles (N, S) which are arranged along a fourth magnet axis (A4) in a row and which is associated with the third retaining magnet (55) and wherein the third magnet axis (A3) and the fourth magnet axis (A4) are not aligned coaxially with each other when the counter holding device (26) is connected with the holding device (25).

18. The arrangement according to claim 17, wherein the first magnet axis (A1) and the third magnet axis (A3) are orthogonal to each other and/or the second magnet axis (A2) and the fourth magnet axis (A4) are orthogonal to each other.

19. The arrangement according to claim 16, wherein the holding device (25) comprises a fifth retaining magnet (57) having magnetic poles (N, S) which are arranged along a fifth magnet axis (A5) in a row that is parallel to the first magnet axis (A1).

20. The arrangement according to claim 19, wherein the counter holding device (26) comprises a sixth retaining magnet (58) having magnetic poles (N, S) which are arranged along a sixth magnet axis (A6) in a row that is parallel to the second magnet axis (A2).

21. The arrangement according to claim 20, wherein the fifth retaining magnet (57) and the second retaining magnet (54) repel each other.

22. An arrangement, comprising:
a measurement arm receptacle device (18) of a measurement system (15); and a measurement arm (16);
wherein the measurement arm receptacle device (18) comprises a holding device (25) and the measurement arm (16) comprises a counter holding device (26), wherein the holding and counter holding devices (25, 26) are configured for cooperation in order to releasably arrange the measurement arm (16) at the measurement arm receptacle device (18);

wherein the holding device (25) comprises a first retaining magnet (53) having magnetic poles (N, S) which are arranged along a first magnet axis (A1) in a row;

wherein the counter holding device (26) comprises a second retaining magnet (54) having magnetic poles (N, S) which are arranged along a second magnet axis (A2) in a row and that is associated to the first retaining magnet (53);

wherein the first magnet axis (A1) and the second magnet axis (A2) are not aligned coaxially with each other when the counter holding device (26) is connected with the holding device (25);

wherein the holding device (25) comprises a third retaining magnet (55) having magnetic poles (N, S) which are arranged along a third magnet axis (A3) in a row, wherein the first magnet axis (A1) and the third magnet axis (A3) extend inclined to each other, and wherein the counter holding device (26) comprises a fourth retaining magnet (56) having magnetic poles (N, S) which are arranged along a fourth magnet axis (A4) in a row and which is associated with the third retaining magnet (55) and wherein the third magnet axis (A3) and the fourth magnet axis (A4) are not aligned coaxially with each other when the counter holding device (26) is connected with the holding device (25);

wherein the holding device (25) comprises a fifth retaining magnet (57) having magnetic poles (N, S) which are arranged along a fifth magnet axis (A5) in a row that is parallel to the first magnet axis (A1) and wherein the counter holding device (26) comprises a sixth retaining magnet (58); and wherein the fifth retaining magnet (57) and the second retaining magnet (54) repel each other, the fifth retaining magnet (57) and the sixth retaining magnet (58) attract each other and the first retaining magnet (53) and the second retaining magnet (54) attract each other.

23. The arrangement of claim 22, wherein the measurement arm receptacle device (18) comprises a receptacle body (19) that is pivotably supported about a rotation axis (D) and extends in an x-direction away from the rotation axis (D) toward a free end of the receptacle body (19);

wherein the fifth retaining magnet (57) and the first retaining magnet (53) are arranged with distance to one another in the x-direction and wherein the fifth retaining magnet (57) is located closer to the free end of the receptacle body (19) than the first retaining magnet (53).

* * * * *